Figures 1, 2:
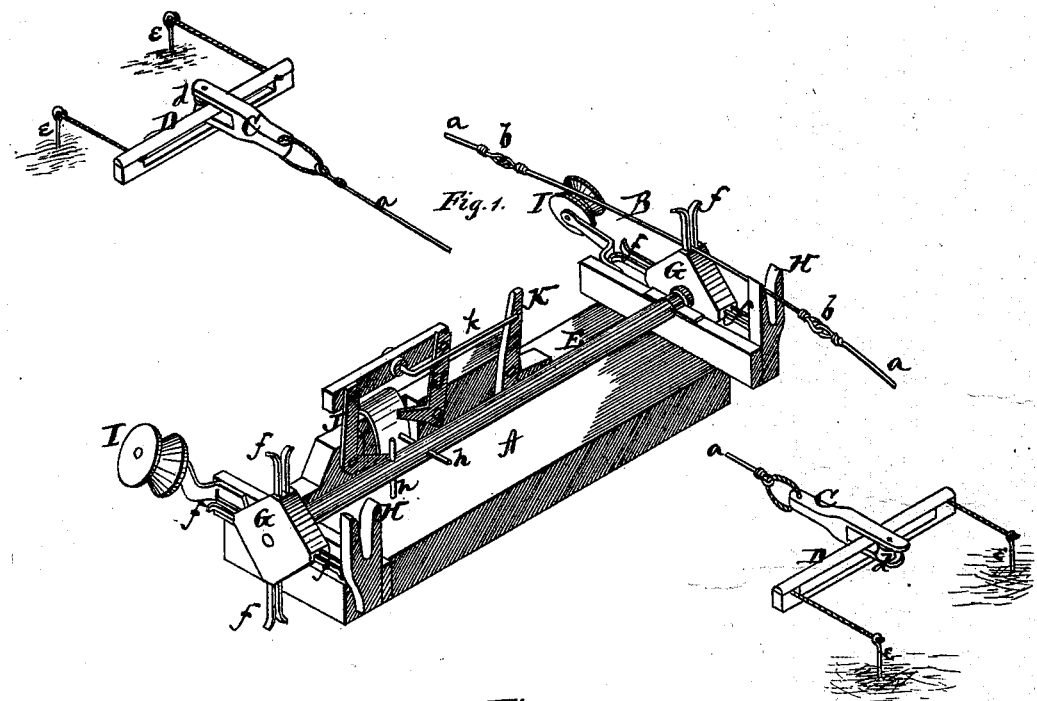

A. BARNES.

Improvement in Corn-Planters.

No. 132,792. Patented Nov. 5, 1872.

Witnesses:
Henry N. Miller
C. L. Evert

Inventor.
Alden Barnes,
per
Alexander Mason
Attorneys.

UNITED STATES PATENT OFFICE.

ALDEN BARNES, OF BLOOMINGTON, ILLINOIS.

IMPROVEMENT IN CORN-PLANTERS.

Specification forming part of Letters Patent No. 132,792, dated November 5, 1872.

*To all whom it may concern:*

Be it known that I, ALDEN BARNES, of Bloomington, in the county of McLean and in the State of Illinois, have invented certain new and useful Improvements in Check-Row Attachment for Corn-Planters; and do hereby declare that the following is a full, clear, and exact description thereof, reference being had to the accompanying drawing and to the letters of reference marked thereon making a part of this specification.

The nature of my invention consists in the construction and arrangement of a check-row attachment for corn-planters, as will be hereinafter more fully set forth.

In order to enable others skilled in the art to which my invention appertains to make and use the same, I will now proceed to describe its construction and operation, referring to the annexed drawing, in which—

Figure 1 is a perspective view of the check-row attachment; and Fig. 2 is an end view of the same.

A represents the forward part of any corn-planter where the seed-boxes are attached. The check-rower is attached crosswise of the planter, over and above the seed-boxes, which brings the ends of the revolving shaft on to each side of the planter, the attachment being fastened to the planter with suitable braces to hold it in position. My check-row attachment is made to work or operate when the planter moves, by means of a wire-chain, B, made in sections $a\,a$, forming enlargement or projections $b\,b$ at the points where the sections are joined together. The sections $a\,a$ must be of the length that the hills of corn are desired to be apart. The chain B is stretched across the field to be planted, and each end of it attached to a bar, C, having a pulley, $d$, and this bar and pulley playing on a horizontal bar, D, which is about two or three feet long, and staked to the ground by pins $e\,e$, or other suitable means. The projections or shoulders $b\,b$ on the chain are large enough, so that when the planter moves the shoulders of the chain thrown over the claws in the hub, hereinafter described, cause the shaft to revolve. E represents the revolving shaft, which at each end is provided with a hub, G, having four radiating claws, $f\,f$, at equal distances apart. Behind the claws is a guard, H, to keep the chain in place, and before the claws is a pulley, I, which plays on its axis, and is inclined inward at an angle of about forty degrees with a vertical line, which pulley is used to bring and keep the chain in place to be received by the claws. Two bars or pins, $h\,h$, of iron or other metal, pass through (or they may be affixed upon) the shaft E, at right angles with it, and at right angles with each other, and at a suitable distance apart. These pins or bars are so adjusted and arranged, that when the shaft revolves they strike the elbow-levers J J, which are connected with and move the rod $k$, and this in turn is connected with and operates the lever K, by which the corn is discharged from the seed-box of the planter. The chain is fixed by means of the horizontal bars and pins, above described, at both ends on one side of the field. It is then thrown over the guard, claw, and pulley, and the planter driven forward. The shoulder $b$ at each section of the chain causes the shaft to revolve, the pins therein operating the elbow-levers, and these in turn, through or by means of the rod $k$, move the feed-box lever K back and forth regularly. When the end of the field is reached toward which the planter is driven, that end of the chain must be moved over the distance of the width of two rows. The planter is then turned around, the chain thrown over as before, and the planter is driven on. A hub, guard, and pulley are necessarily attached to each end of the planter, one side to be used when driving in one direction and the other in return.

Having thus fully described my invention, what I claim as new, and desire to secure by Letters Patent, is—

1. The hubs G G provided each with four radiating claws, $f\,f$, at equal distances apart, and secured one on each end of the shaft E, substantially as and for the purposes herein set forth.

2. The combination, with the hubs G G, radiating arms $f\,f$, guards H, wheels I, and chains B, of the forked rods C C with pulleys

*d d* and slotted bars D D, staked to the ground, substantially as and for the purposes set forth.

3. The combination of the shaft E, revolved by the sectional chain B passing over the pulley I, claws *f*, and guard H, the pins *h h*, elbow-levers J J, rod *k*, and lever K, all substantially as and for the purposes herein set forth.

In testimony that I claim the foregoing I have hereunto set my hand this 28th day of June, 1872.

ALDEN BARNES.

Witnesses:
  W. M. HATCH,
  N. T. PUSEY.